(12) United States Patent
Kemp et al.

(10) Patent No.: US 7,213,060 B2
(45) Date of Patent: May 1, 2007

(54) WEB BASED CREATION OF PRINTER INSTANCES ON A WORKSTATION

(75) Inventors: Devon James Kemp, Laguna Hills, CA (US); Christopher John Carcerano, Aliso Viejo, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 92 days.

(21) Appl. No.: 10/413,307

(22) Filed: Apr. 15, 2003

(65) Prior Publication Data

US 2003/0200292 A1    Oct. 23, 2003

Related U.S. Application Data

(63) Continuation of application No. 10/131,290, filed on Apr. 23, 2002, now abandoned.

(51) Int. Cl.
*G06F 15/177*    (2006.01)

(52) U.S. Cl. .................. 709/222; 709/203; 709/219; 709/221; 709/226; 709/245; 717/178; 719/327

(58) Field of Classification Search ............ 709/203, 709/217, 219–222, 226, 229, 245; 719/321, 719/327; 717/174–178
See application file for complete search history.

(56) References Cited

U.S. PATENT DOCUMENTS

| | | | |
|---|---|---|---|
| 4,979,107 A | 12/1990 | Advani et al. | 364/200 |
| 5,047,957 A | 9/1991 | Ikenoue | 364/519 |
| 5,371,837 A | 12/1994 | Kimber et al. | 395/114 |
| 5,450,571 A | 9/1995 | Rosekrans et al. | 395/500 |

(Continued)

FOREIGN PATENT DOCUMENTS

GB    2 347 766    9/2000

(Continued)

OTHER PUBLICATIONS

"Read Me First", Lexis-Nexis® P-2219-1.

(Continued)

*Primary Examiner*—Oanh Duong
(74) *Attorney, Agent, or Firm*—Fitzpatrick, Cella, Harper & Scinto

(57) ABSTRACT

Web based installation of a printer in a printers folder on a workstation for peer-to-peer communication over a network between the workstation and the printer, by downloading a printers html page to the workstation, the printers html page providing hyperlinks of printers that can be added to the workstation, selecting a hyperlink for a printer to be added to the workstation, in response to the selecting step, extracting identification information of the selected printer from the selected hyperlink and executing a component object to install the printer, wherein, the component object calls a function that automatically obtains printer configuration information and print driver information based at least in part on the extracted identification information, automatically configures the printer and installs a print driver based on the obtained printer configuration information and print driver information, and creates a locally managed instance of the printer on the workstation. In a case where the component object is not installed on the workstation, an executable file (CAB) that includes the component object and the function (DDI) is downloaded such that, when the CAB file is executed, the DDI is installed and the component object is executed.

32 Claims, 9 Drawing Sheets

U.S. PATENT DOCUMENTS

| | | | | |
|---|---|---|---|---|
| 5,467,434 | A | | 11/1995 | Hower, Jr. et al. ......... 395/114 |
| 5,550,957 | A | | 8/1996 | Davidson, Jr. et al. ..... 395/114 |
| 5,555,416 | A | | 9/1996 | Owens et al. ................ 395/700 |
| 5,692,111 | A | * | 11/1997 | Marbry et al. .............. 358/1.15 |
| 5,832,191 | A | | 11/1998 | Thorne ........................ 395/114 |
| 5,845,090 | A | | 12/1998 | Collins, III et al. .... 395/200.51 |
| 5,848,231 | A | | 12/1998 | Teitelbaum et al. ......... 395/186 |
| 5,860,012 | A | | 1/1999 | Luu ............................ 395/712 |
| 5,867,633 | A | | 2/1999 | Taylor, III et al. .......... 395/109 |
| 5,870,610 | A | | 2/1999 | Beyda ......................... 395/712 |
| 5,923,885 | A | | 7/1999 | Johnson et al. ............. 717/176 |
| 5,999,941 | A | * | 12/1999 | Andersen ................ 707/103 R |
| 6,023,585 | A | * | 2/2000 | Perlman et al. ............. 717/178 |
| 6,070,012 | A | | 5/2000 | Eitner et al. ................ 395/712 |
| 6,094,679 | A | * | 7/2000 | Teng et al. .................. 709/220 |
| 6,098,097 | A | | 8/2000 | Dean et al. .................. 709/220 |
| 6,138,153 | A | | 10/2000 | Collins, III et al. ......... 709/221 |
| 6,151,643 | A | | 11/2000 | Cheng et al. .................. 710/36 |
| 6,184,998 | B1 | | 2/2001 | Tebeka ....................... 358/1.15 |
| 6,301,012 | B1 | | 10/2001 | White et al. ............... 358/1.15 |
| 6,327,045 | B1 | * | 12/2001 | Teng et al. .................. 358/1.15 |
| 6,772,420 | B1 | * | 8/2004 | Poger et al. ................. 719/327 |
| 6,789,111 | B1 | * | 9/2004 | Brockway et al. .......... 709/222 |
| 6,809,830 | B1 | * | 10/2004 | Lafky ........................ 358/1.13 |
| 6,847,466 | B1 | * | 1/2005 | Gazdik et al. .............. 358/1.15 |
| 6,959,437 | B2 | * | 10/2005 | Schacht et al. ............. 719/321 |
| 2002/0174206 | A1 | * | 11/2002 | Moyer et al. ............... 709/221 |
| 2003/0051011 | A1 | * | 3/2003 | Schacht et al. ............. 709/221 |
| 2003/0055874 | A1 | * | 3/2003 | Simpson et al. ............ 709/203 |
| 2003/0090694 | A1 | * | 5/2003 | Kennedy et al. ........... 358/1.13 |
| 2003/0115302 | A1 | * | 6/2003 | Teraoaka et al. ............ 709/221 |
| 2003/0120624 | A1 | * | 6/2003 | Poppenga et al. ............. 707/1 |
| 2003/0131150 | A1 | * | 7/2003 | Sugiura ...................... 709/321 |
| 2003/0137689 | A1 | * | 7/2003 | Bontempi .................. 358/1.15 |
| 2003/0160989 | A1 | * | 8/2003 | Chapin et al. ............. 358/1.13 |
| 2004/0167973 | A1 | * | 8/2004 | Shima et al. ............... 709/220 |
| 2005/0038927 | A1 | * | 2/2005 | Choi et al. ...................... 710/8 |

FOREIGN PATENT DOCUMENTS

| | | |
|---|---|---|
| JP | 2000-298567 | 10/2000 |
| JP | 2001-325170 | 11/2001 |
| JP | 2003-202986 | 7/2003 |
| JP | 2004199102 A * | 7/2004 |

OTHER PUBLICATIONS

"WSH Walkthrough", Microsoft Corp. Website, URL: http://msdn.microsoft.com/library/en-us/script56/html/. . . , site visited Apr. 2, 2002.

"WSH Network Administrator Sample Script", Microsoft Corp. Website, URL: http://msdn.microsoft.com/library/en-us/script56/html/. . . , site visited Apr. 2, 2002.

"Novell Distributed Print Services Administration Guide", Novell Corp., pp. 15 to 194. Downloaded from Novell website Apr. 2, 2002.

* cited by examiner

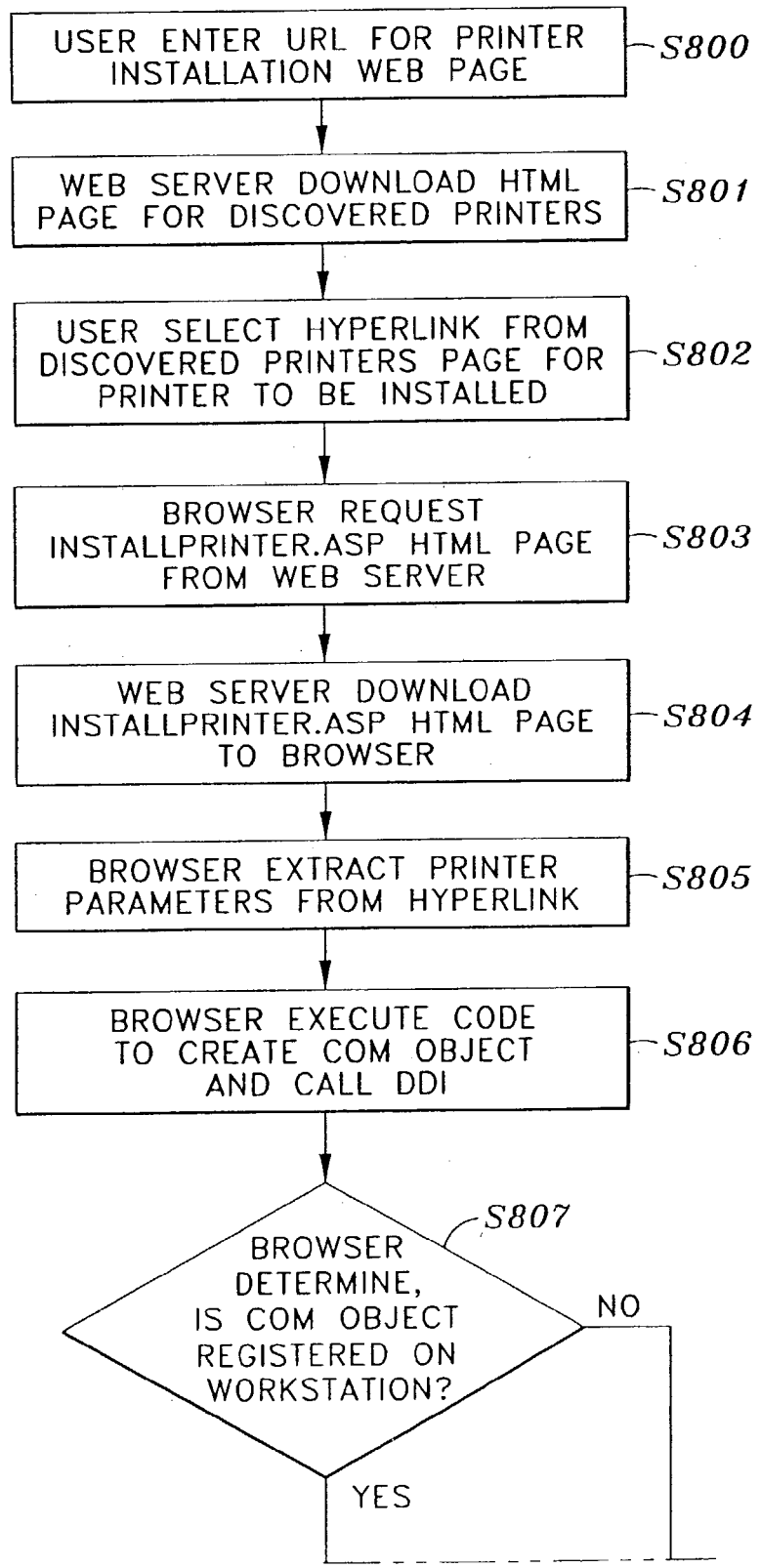

WEB BASED CREATION OF PRINTER INSTANCES ON A WORKSTATION

This application is a continuation of application Ser. No. 10/131,290, filed Apr. 23, 2002 now abandoned.

BACKGROUND OF THE INVENTION

1. Field of the Invention

The present invention concerns creation of printer instances in a printers folder on a workstation. More particularly, the present invention concerns creating a printer instance in the printers folder of a workstation for peer-to-peer communication over a local network between the workstation and the printer by accessing a website listing of printers that can be added to the printers folder of the workstation and selecting a printer from the website listing, whereby in response to the selection, identification information of the selected printer and command information is transmitted via the Internet to the workstation such that printer configuration information and print driver information of the printer are automatically obtained and installed on the workstation and the instance of the printer is created in the printers folder.

2. Description of the Related Art

Conventionally, printer instances are created in a windows operating system by a user performing operations at the workstation. For instance, U.S. Pat. No. 5,692,111 to Marbry et al. (hereinafter referred to as the "'111 patent") describes a process in which a user adds a new server based printer of a local network in the windows registry of their workstation by browsing the local network and selecting the server based printer that he/she wants to add. Upon selecting the server based printer, printer configuration files and print driver files for the selected printer are retrieved from the network bindery and are installed on the user's workstation, after which an instance of the server based printer is created in the user's windows registry. This process works well for installing printers that are part of, for example, a local area network serviced by a print server where the user is connected to the local area network. However, this technique requires that the user's workstation have network client software installed on the workstation and that the user be logged-in to the network before the user is able to install the printer. As a result, if the user's workstation does not have the necessary network client software installed, or the user is unable to log-in to the network, for example, due to a lack of administrative rights, the user is unable to install and/or print to the printer. Another problem with the '111 patent is that, because the printer is part of a server based printing system, the printer is required to be set-up on the print server before a user is able to install the printer on their workstation and submit a print job to the printer. Accordingly, what is needed is an easier way for a user to install a printer on a workstation.

SUMMARY OF THE INVENTION

The present invention provides an easier way to install a printer in a printers folder on a workstation for peer-to-peer communication over a local network between the workstation and the printer. According to the invention, a user accesses a website of printers that can be added to the workstation using a browser on their workstation, wherein an html page is downloaded to the browser to display a listing of printers that can be added. The html page includes a hyperlink for each listed printer, wherein the hyperlink includes identification information of the printer. To add a printer, the user simply clicks on the hyperlink for the printer that they want to add to the workstation. The hyperlink includes a reference for an active server page that is then downloaded to the browser. The active server page includes script that extracts the identification information (parameters) of the selected printer from the hyperlink, and script that executes an installer to install the printer. The installer in the workstation, utilizing the extracted parameters, automatically obtains printer configuration information and print driver information, automatically configures the printer and installs the print driver on the workstation, and finally, creates a locally managed instance of the printer on the workstation.

As a result, the invention simplifies the process for creating an instance of a printer on a workstation since no client network software is needed and since the user does not need to log-in to the network. Moreover, even though the selected printer may be a printer that is part of a local area network, the user is able to install the printer on their workstation and submit print jobs to the printer regardless of whether they are logged-on to the network since the printer instance is for peer-to-peer communication (i.e., is a locally managed instance). Further, the user merely selects the printer from a listing and need not know any further information about the printer, the print driver needed for the selected printer, the name of the port needed for communication with the printer, etc., since all the necessary processes are performed transparent to the user.

Thus, in one aspect of the invention, web based installation of a printer in a printers folder on a workstation for peer-to-peer communication over a network between the workstation and the printer comprises downloading a printers html page to the workstation, the printers html page providing hyperlinks of printers that can be added to the workstation, selecting a hyperlink for a printer to be added to the workstation, in response to the selecting step, extracting identification information of the selected printer from the selected hyperlink and executing a component object to install the printer, wherein, the component object calls a function (a DDI, for example) that automatically obtains printer configuration information and print driver information based at least in part on the extracted identification information, automatically configures the printer and installs a print driver based on the obtained printer configuration information and print driver information, and creates a locally managed instance of the printer on the workstation.

In a related aspect, if the component object to be executed is not installed on the workstation, an executable file is downloaded to the workstation, where the executable file includes the component object and the function, which may be, for example, a dynamic device installer (DDI).

Other aspects provide for the printer configuration information and the print driver information to be automatically obtained from a remote device on the network, such as an FTP server, and automatically creating a port for communication with the printer. Thus, a database of printer configuration information and print drivers can be maintained on a remote server such that they can be readily accessed anytime an instance of a locally managed printer is to be created.

Additionally, the identification information of the printer may be a network address of the printer, such as an IP address, a printer's name, a DNS name or a NetBios name. With this aspect, the web server merely provides an IP address or name of the printer to the workstation and the IP address or name is utilized by the workstation to obtain the printer configuration and print driver information from a database, such as that described above.

Further, the printer need not be an actual printer installed on the network, but may be a virtual printer instead. With this aspect, users can easily create an instance of a virtual printer on a workstation merely by selecting, for example, a hyperlink of a virtual printer from the website listing, whereby an identifier of the virtual printer is transmitted to the workstation. In this regard, the database of printer configuration information and print driver information may include the required information for various virtual printers as well as actual printers installed on the network. As a result, a user can easily create an instance of a virtual printer on a workstation by merely selecting the virtual printer from the website listing.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
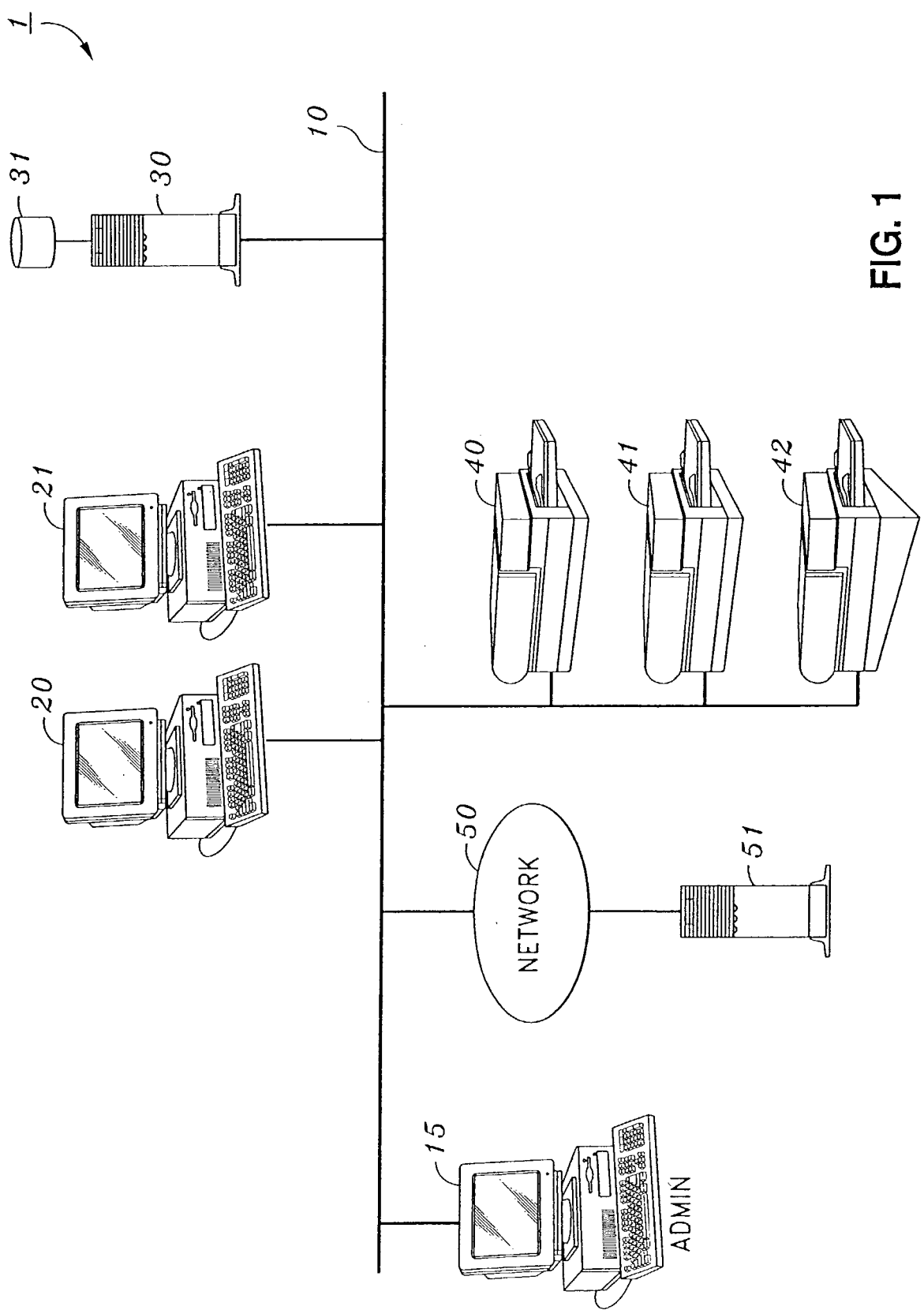
FIG. 1 depicts an example of a network environment in which the invention may be employed.

FIG. 1 depicts an example of a network environment in which the invention may be employed. The network 1 is preferably a local area network (LAN), but may be virtually any other type of network. Network 1 may include various computing components such as workstations, printers, servers, etc. that communicate with one another over network infrastructure, generally depicted as backbone 10. Backbone 10 may include various communication devices such as routers and data communication hubs (not shown) that provide a communication link between the various components connected to the network, as well as communication with other networks such as Internet 50 which preferably includes web server 51. Network 1 preferably includes a plurality of client workstations, such as workstations 20 and 21, a plurality of printers, such as printers 40 to 42 and at least one network administrator terminal 15. Network administrator terminal 15 provides a way for an administrator to manage the network, including performing operations to add new printers to a listing of printers on the network, where the listing may be maintained in, for example, a web page of web server 51. Each of the client workstations are preferably capable of submitting print jobs to at least one of printers 40 to 42. The print jobs may be submitted to the printers on either a peer-to-peer basis, or as a server based print job. In this regard, network 1 may also include at least one local server, such as server 30, which may include a fixed storage disk such as disk 31. Each of the components shown in FIG. 1 are merely representative of some devices that may be included in a network environment and, of course, numerous other components may also be connected to the network. However, for brevity, the description of the invention will be limited to use with those components shown in FIG. 1.

Client workstation 20 is preferably an IBM or compatible personal computer employing a windows operating system, such as Microsoft® Windows® 2000 or Window NT® 4.0. Workstation 20 preferably includes a mass storage device such as a hard disk for storing data files and application program files. As stated above, workstation 20 preferably employs a windows operating system which would be stored on the hard disk. From workstation 20, a user can perform various operations utilizing application programs stored on the disk, including accessing a website via the Internet, and submitting print jobs to any of printers 40 to 42 connected to network 1. That is, a user, wanting to print a hardcopy printout on one of printers 40 to 42 performs a process within an application program to submit the print job to a selected printer. In this regard, before the user is able to submit the print job to one of printers 40 to 42, necessary print driver and configuration files are required to be installed on workstation 20 in order for workstation 20 to communicate with the selected printer. This process will be described in more detail below, but once the necessary files are installed and the workstation is able to communicate with the printer, the user is able to select the printer and submit a print job thereto. Workstation 20 is also able to communicate with the other devices on the network, such as server 30 and web server 51, and this process will also be described in more detail below.

Printers 40 to 42 are connected to network 1 for users, such as a user at workstation 20, to be able to submit a print job to them for printing. Printers 40 to 42 are preferably network enabled printers that include a network interface for communicating with workstation 20 via backbone 10. In this regard, printers 40 to 42 may be any type of network enabled printer and need not be any particular type of printer. Since printers 40 to 42 are network enabled printers, they are generally connected to and setup for communication over the network by a network administrator. The administrator may also add the printer to a listing of printers maintained at a known web site, from which users can browse the listing and select a printer to be added to the workstation. That is, once the printer has been added to the network, as described above, the printer must first be installed on the workstation before the user can submit a print job to it. The present invention provides a way for the user install the printer by accessing a listing of printers maintained on a web server via the Internet. This process will be described in more detail below.

Figure 2:
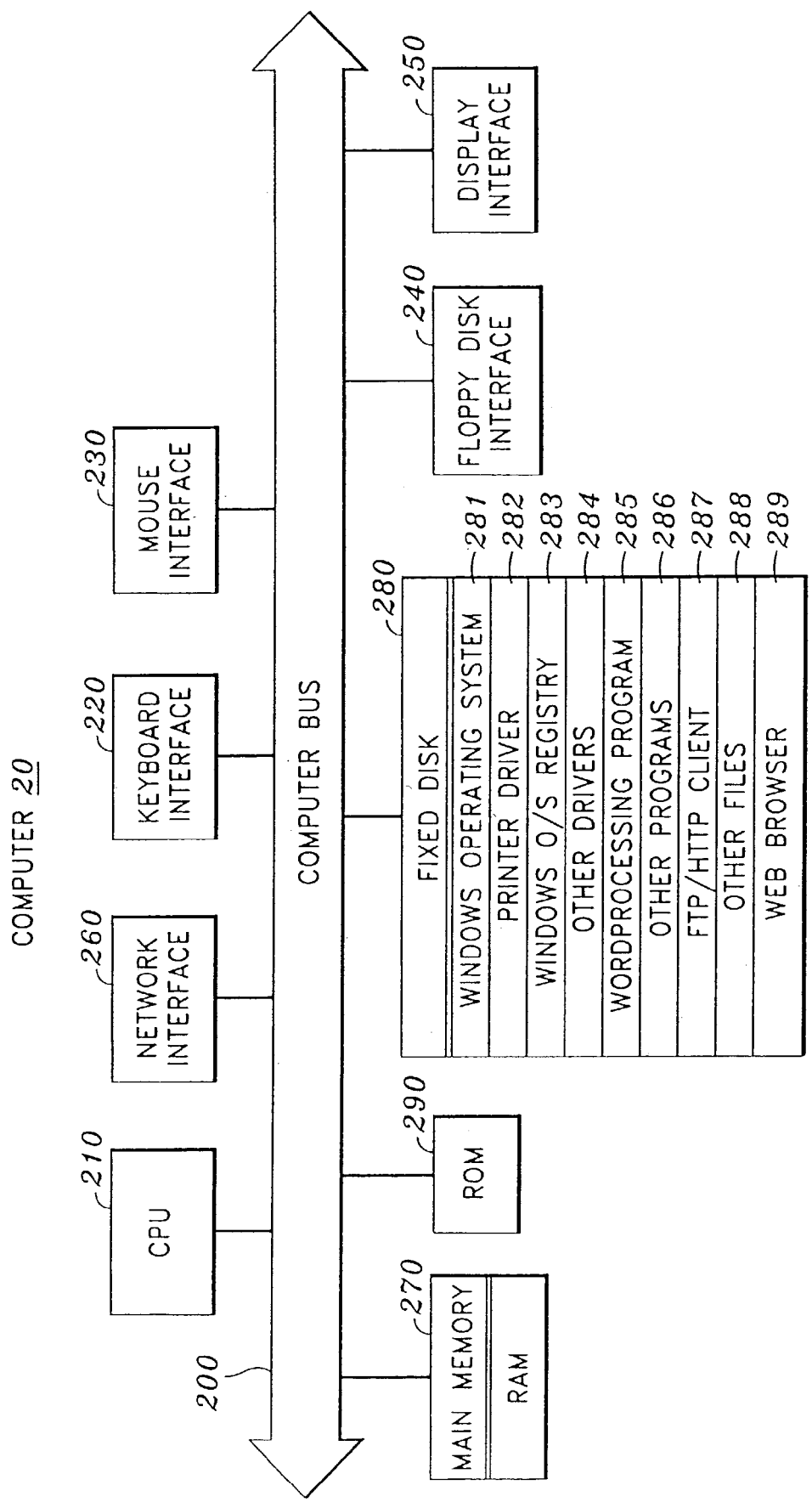
FIG. 2 depicts an example internal architecture of a computer workstation.

FIG. 2 is a block diagram showing an example of the internal architecture of workstation 20. In FIG. 2, workstation 20 is seen to include central processing unit (CPU) 210 such as a programmable microprocessor which is interfaced to computer bus 200. Also coupled to computer bus 200 are keyboard interface 220 for interfacing to a keyboard, mouse interface 230 for interfacing to a mouse or other pointing device, floppy disk interface 240 for interfacing to a floppy disk, display interface 250 for interfacing to a monitor or other display, and network interface 260 for interfacing to backbone 10.

Random access memory (RAM) 270 interfaces to computer bus 200 to provide CPU 210 with access to memory storage, thereby acting as the main run-time memory for CPU 210. In particular, when executing stored program instruction sequences, CPU 210 loads those instruction sequences from fixed disk 280 (or other memory media) into RAM 270 and executes those stored program instruction sequences out of RAM 270. It should also be noted that standard-disk swapping techniques available under windowing operating systems allow segments of memory to be swapped to and from RAM 270 and fixed disk 280. Read-only memory (ROM) 290 stores invariant instruction sequences, such as start-up instruction sequences for CPU 210 or basic input/output operation system (BIOS) sequences for the operation of peripheral devices attached to workstation 20.

Fixed disk 280 is one example of a computer-readable medium that stores program instruction sequences executable by CPU 210. The program instructions may constitute windows operating system 281, printer driver 282, windows operating system registry 283, other drivers 284, word processing program 285, other programs 286, FTP/HTTP client 287, other files 288, and web browser 289. As mentioned above, operating system 281 is preferably a windows operating system such as Microsoft® Windows® 2000, although other types of operating systems may be used with the present invention. Printer driver 282 is utilized to prepare image data for printing on at least one image forming device, such as printers 40 to 42. Windows Registry 283 stores information for registering various devices in the windows operating system when the devices are installed on workstation 20. Other drivers 284 include drivers for each of the remaining interfaces which are coupled to computer bus 200.

Word processing program 285 is a typical word processor program for creating documents and images, such as Microsoft Word, or Corel WordPerfect documents. Other programs 286 contains other programs necessary to operate workstation 20 and to run desired applications. FTP/HTTP client 287 provides functionality for workstation 20 to request and receive data and information via FTP (File Transfer Protocol) and HTTP (Hypertext Transfer Protocol) protocols from other devices connected to the network. Other files 288 include any of the files necessary for the operation of workstation 20 or files created and/or maintained by other application programs on workstation 20. Web browser application 289 is preferably an Internet browser application program such as Microsoft Internet Explorer or Netscape Navigator.

Figure 3:
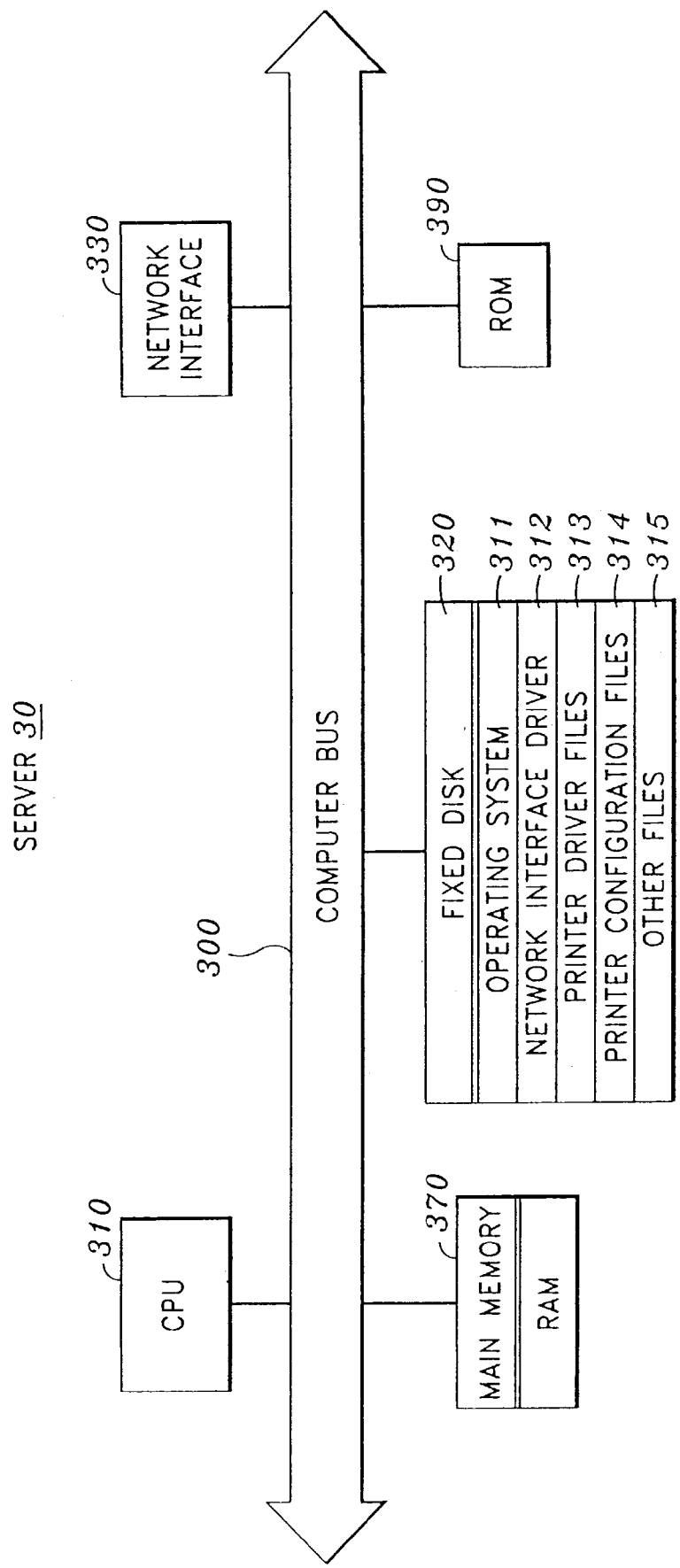
FIG. 3 depicts an example internal architecture of a local area network server.
Figure 4:
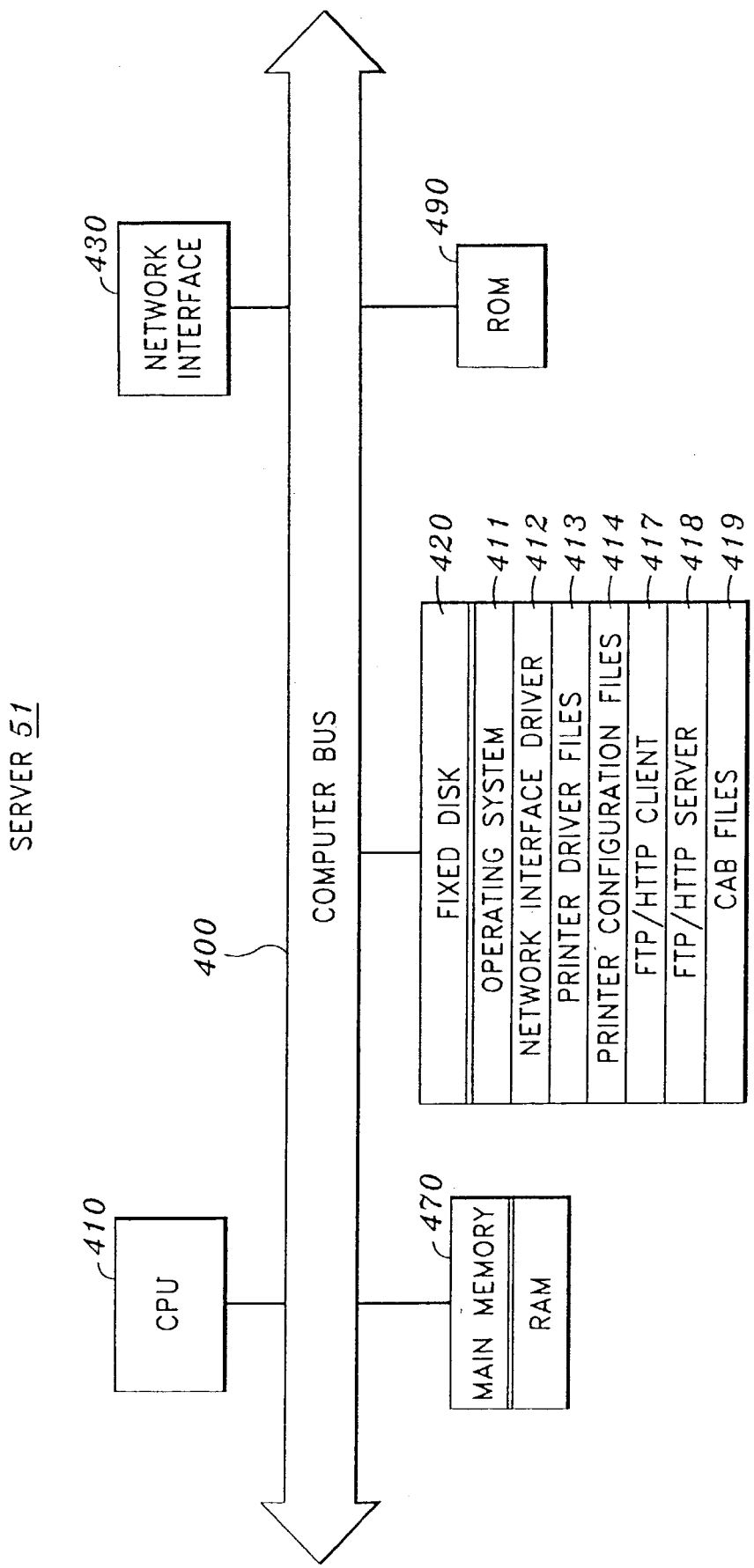
FIG. 4 depicts an example internal architecture of a web server.

FIGS. 3 and 4 depict block diagrams showing an overview of the internal architecture of a server, such as servers 30 and 51, respectively. In this regard, the internal architecture of the servers may be similar, but each may include different functionality in the software components. Accordingly, the following description of the internal architecture applies equally for both of servers 30 and 51 with like components having corresponding reference numerals, except where specifically pointed out. In FIG. 3, server 30 is seen to include a central processing unit (CPU) 310 such as a programmable microprocessor which is interfaced to computer bus 300. Also coupled to computer bus 300 is a network interface 360 for interfacing to backbone 10. In addition, random access memory (RAM) 370, fixed disk 320, and read-only (ROM) 390 are also coupled to computer bus 300. RAM 370 interfaces to computer bus 300 to provide CPU 310 with access to memory storage, thereby acting as the main run-time memory for CPU 310. In particular, when executing stored program instruction sequences, CPU 310 loads those instruction sequences from fixed disk 320 (or other memory media) into RAM 370 and executes those stored program instruction sequences out of RAM 370. It should also be recognized that standard disk-swapping techniques allow segments of memory to be swapped to and from RAM 370 and fixed disk 320. ROM 390 stores invariant instruction sequences, such as start-up instruction sequences for CPU 310 or basic input/output operating system (BIOS) sequences for the operation of peripheral devices which may be attached to server 30 (not shown).

Fixed disk 320 is one example of a computer-readable medium that stores program instruction sequences executable by CPU 310. In both server 30 and server 51, the program instruction sequences may include operating system 311 (411), network interface driver 312 (412), printer driver files 313 (413), and printer configuration files 314 (414). Operating system 311 can be an operating system such as Windows NT 4.0 (or later versions thereof), UNIX, Novell Netware or other such server operating systems. Network interface driver 312 is utilized to drive network interface 360 for interfacing server 30 to backbone 10. Printer driver files 313 and printer configuration files 314 are preferably part of a comprehensive database of printer information that is stored in either or both of server 30 or server 51. In this regard, the database preferably includes information for as many printers (including virtual printers) as can be maintained in fixed disk 320 so that printer configuration information and print driver information for practically any printer, including virtual printers, can be obtained and installed on workstation 20. Other files 315 contains other files or programs necessary to operate server 30 and/or to provide additional functionality to server 30.

Differences between server 30 and server 51 may be that server 30 is a local server that serves the local area network as opposed to server 51 being a web server. As stated above, when a new printer is installed on the network, the network administrator generally adds the printer to a listing of printers maintained on a web-server. In this regard, server 51 may include FTP/HTTP client 417 to provide server 51 with the ability to retrieve and transmit data files via FTP and HTTP protocols over the network through network interface 460, and FTP/HTTP server 418 which can be accessed by an FTP/HTTP client in a workstation such as workstation 20. Server 51 may also include CAB files that can be referenced and downloaded from server 51 to workstation 20. CAB files are utilized to facilitate Internet download and are utilized to package ActiveX controls in the form of a ".DLL" file.

A more detailed description will now be made of installing a new printer on a workstation via the Internet. In the following description, it is assumed that a user at workstation 20 wants to print to printer 40, but first must install the printer on their workstation. It is also assumed that a printer has never been installed on workstation 20 utilizing the present invention's web based installation.

Figure 5:
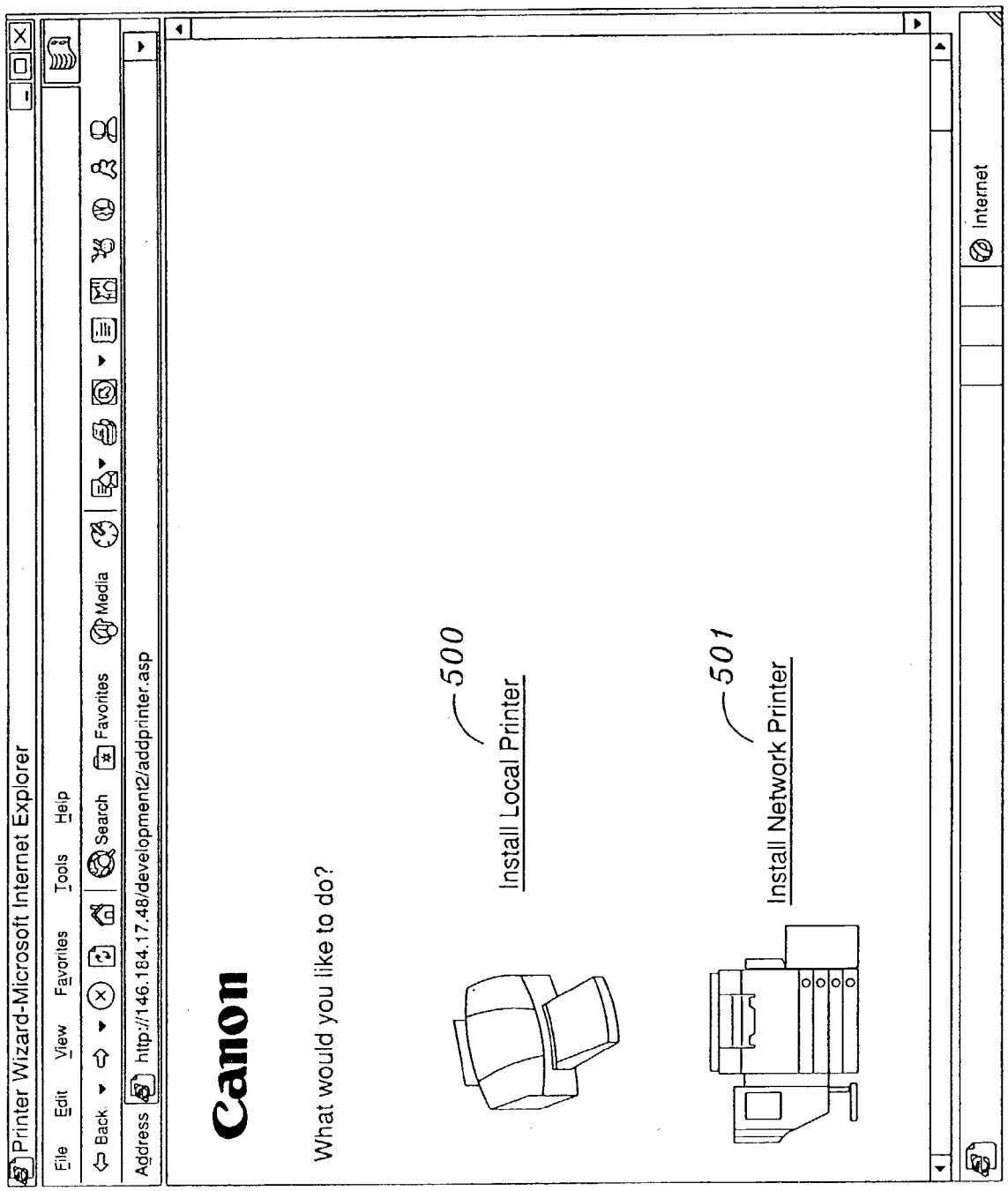
FIG. 5 is an example of a web page for accessing a listing of printers to be installed via the Internet.
Figure 6:
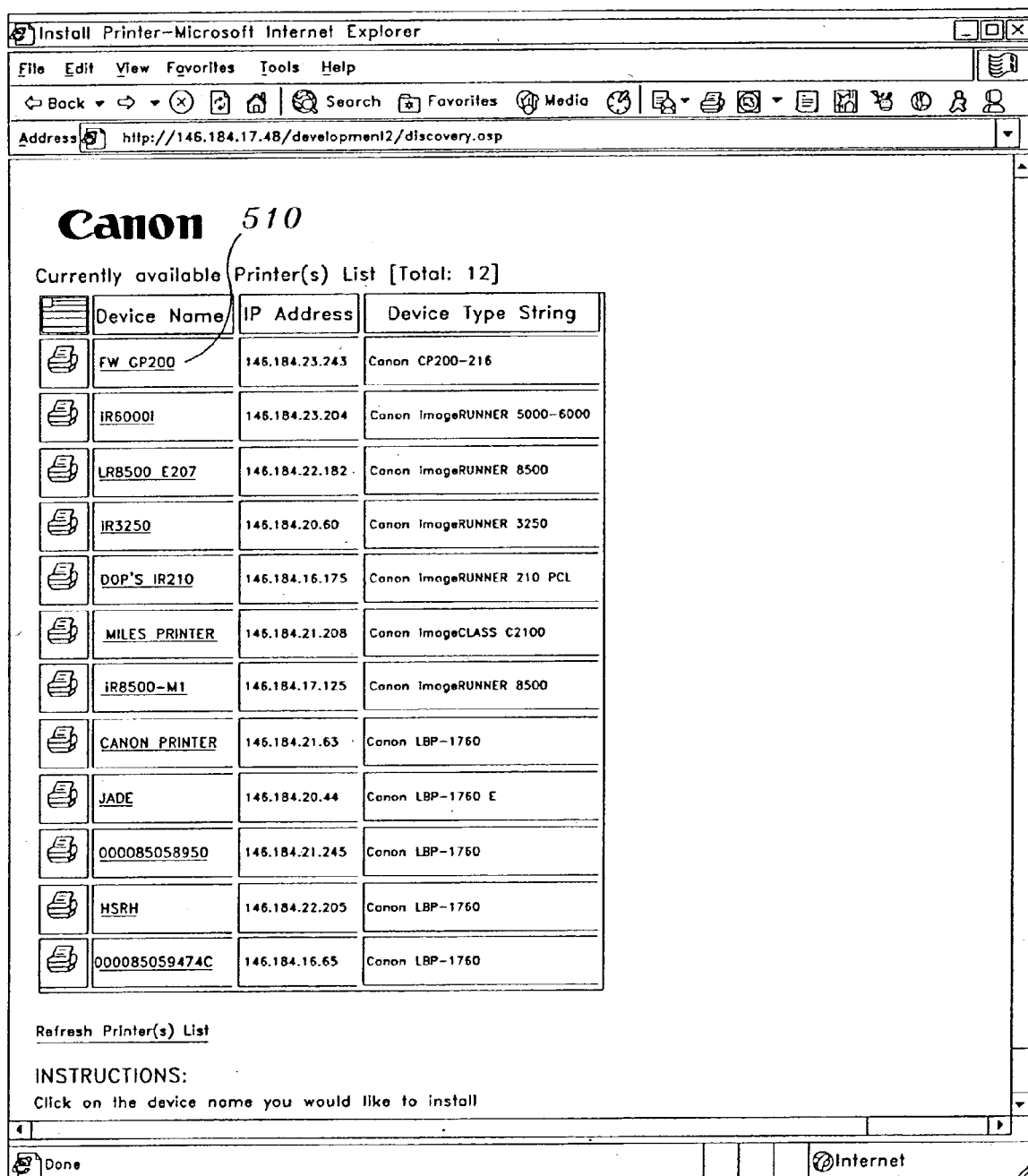
FIG. 6 depicts an example the display of an html page that lists printers and associated hyperlinks for selecting a printer to be installed.

To begin the installation process, the user at workstation 20 activates a web browser on their workstation. The user then enters a URL (Uniform Resource Locator) for a web site of, for example, the enterprise that maintains a listing of printers so as to access a web page for selecting a printer to install via the web. For instance, FIG. 5 depicts an example of a main web page that may be displayed when the user enters the URL shown in the browser of FIG. 5. In the main page shown in FIG. 5, the user can select an option 500 to install either a local printer, or an option 501 to install a network printer. Upon selecting, for example, the Install Local Printer option 500, a DiscoveredPrintersPage html page is downloaded from the web server to the browser on the client workstation. The downloaded html page results in the display of a listing of printers that can be installed, such as that shown in FIG. 6. Each printer has its own hyperlink associated therewith, such as hyperlink 510. In the html page, the code for the hyperlink includes a call for an active server page (to be described below) and parameters associated with the printer, such as the printer's name, IP address and device type. From the listing shown in FIG. 6, the user can click on a hyperlink for the printer that they want to install. For example, the user can click on hyperlink 510 for printer FW GP200. Having clicked on the hyperlink 510, the installation process commences. An example of code for the DiscoveredPrintersPage html page is provided in Appendix A. For brevity, the sample code merely includes code which results in two hyperlinks for the first two printers listed in FIG. 6 (FW GP200 and iR6000i) being displayed.

Once the user clicks on the hyperlink, the browser looks for an Active Server Page (ASP) referenced in the hyperlink. In the present case, as seen in the html page text of Appendix A, the browser looks for an active server page identified as InstallPrinter.asp. The ASP, if not already resident on the workstation, is downloaded to the browser from the web server. The ASP contains scripts that perform various operations. One script is to extract the printer's information (printer's name, IP address and device type) from the hyperlink in the DiscoveredPrintersPage html page. Another is to identify a GUID (Global Unique Identifier) associated with a COM (Component Object Model) object that is to be run on the user's workstation, where the COM object may be, for example, and ActiveX component. Additionally, a .cab file is identified in the script, where the .cab file includes the COM object and a DDI (Dynamic Device Installer) SDK. The ASP also includes another script that causes the COM object to be created, if it does not already exist on the user's workstation, by downloading and executing the .cab file. Executing the .cab file results in installation of the DDI SDK and execution of the COM object. In executing the COM object, a function call to execute the DDI SDK is made, with the printer's information being passed as parameters in the function call. An example of code for an active server page that performs the foregoing is provided in Appendix B.

Figure 7:
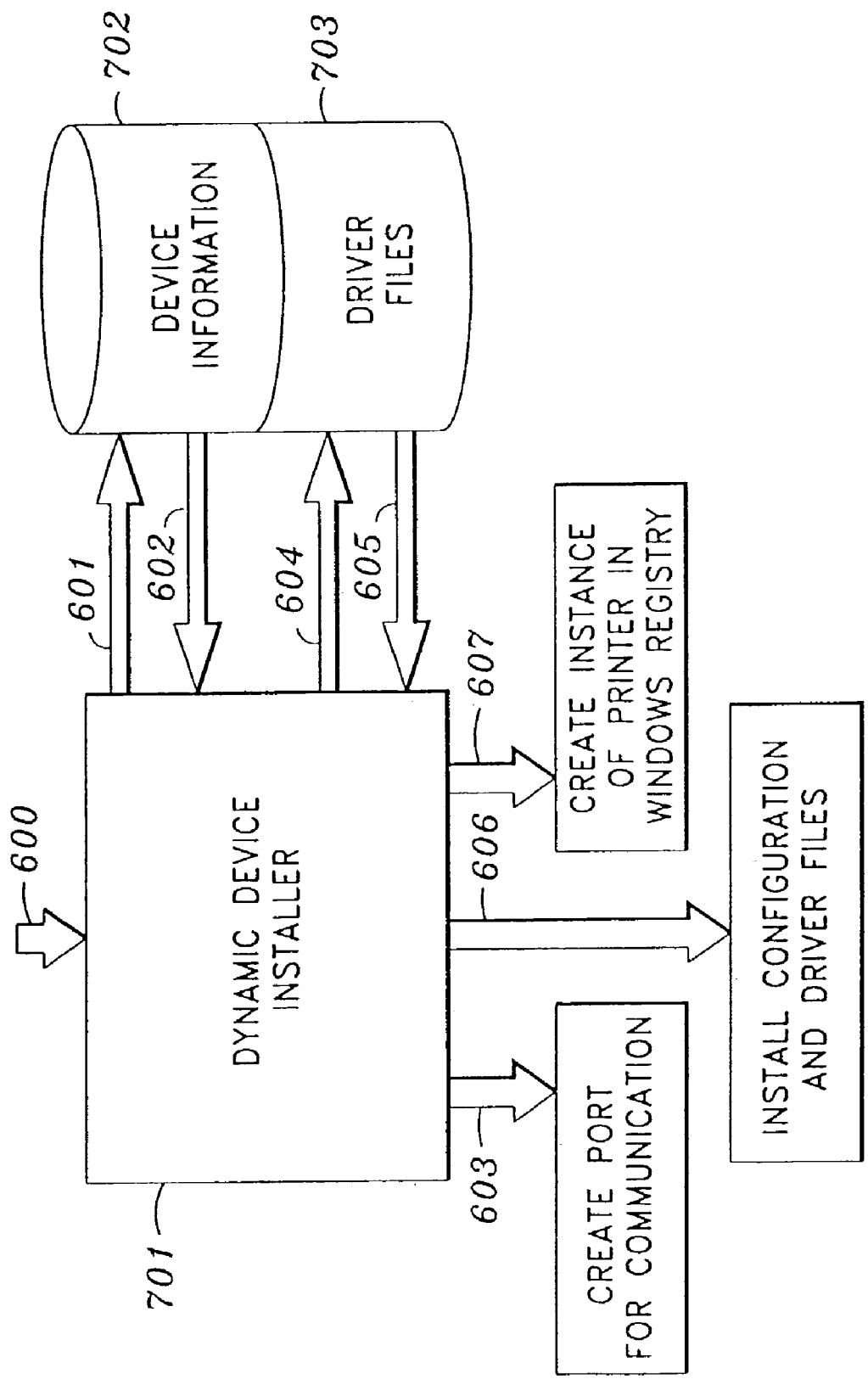
FIG. 7 is an example of communication and process flow for a dynamic device installer.

Referring now to FIG. 7, having called the DDI function and providing the DDI with the printer's identification information and device type, the DDI performs a query (601) of a known database 702 for device configuration information corresponding to the device type. Querying the database 702 may comprise performing an FTP or HTTP query of server 51 for printer configuration files 414. The query may be performed, for example, by utilizing FTP client 417. Of course, if the database of configuration files is included on workstation 20, on a removable recording medium such as a floppy disk or a CD-ROM, or any other storage location, the DDI would query that location instead. Regardless of where the device configuration files are maintained, the printer configuration files are provided to the DDI in a response 602.

Having obtained the device configuration information, the DDI automatically installs the device configuration files (606) and automatically creates a port for communication with the printer (603). That is, the DDI configures the printer as a local printer (i.e., a printer that communicates with the workstation as peer-to-peer) by determining the appropriate port for communicating with the printer and configures the port within the windows operating system of workstation 20 without the need for user input. The DDI automatically creates the port by manually creating the necessary data structures in the registry transparent to the spooler. The DDI then starts-stops the spooler so that the spooler will re-read the data structures, after which the spooler knows of the new printer port and that it can be used to send data.

The DDI then performs a query (604) for print driver files for the type of printer being installed. The query is performed of a database 703 for print driver files, which is preferably maintained in the same location as the database 702. The appropriate print driver files are determined from the database and returned to the DDI via a response (605), whereby the DDI automatically installs the driver files for the printer (606). Once the printer has been configured, the port for communication has been created, and the driver files have been installed, the DDI registers the new printer in the windows registry and creates an instance of the printer (607). The user can then submit a print job directly to the printer from the workstation.

Figure 8B:
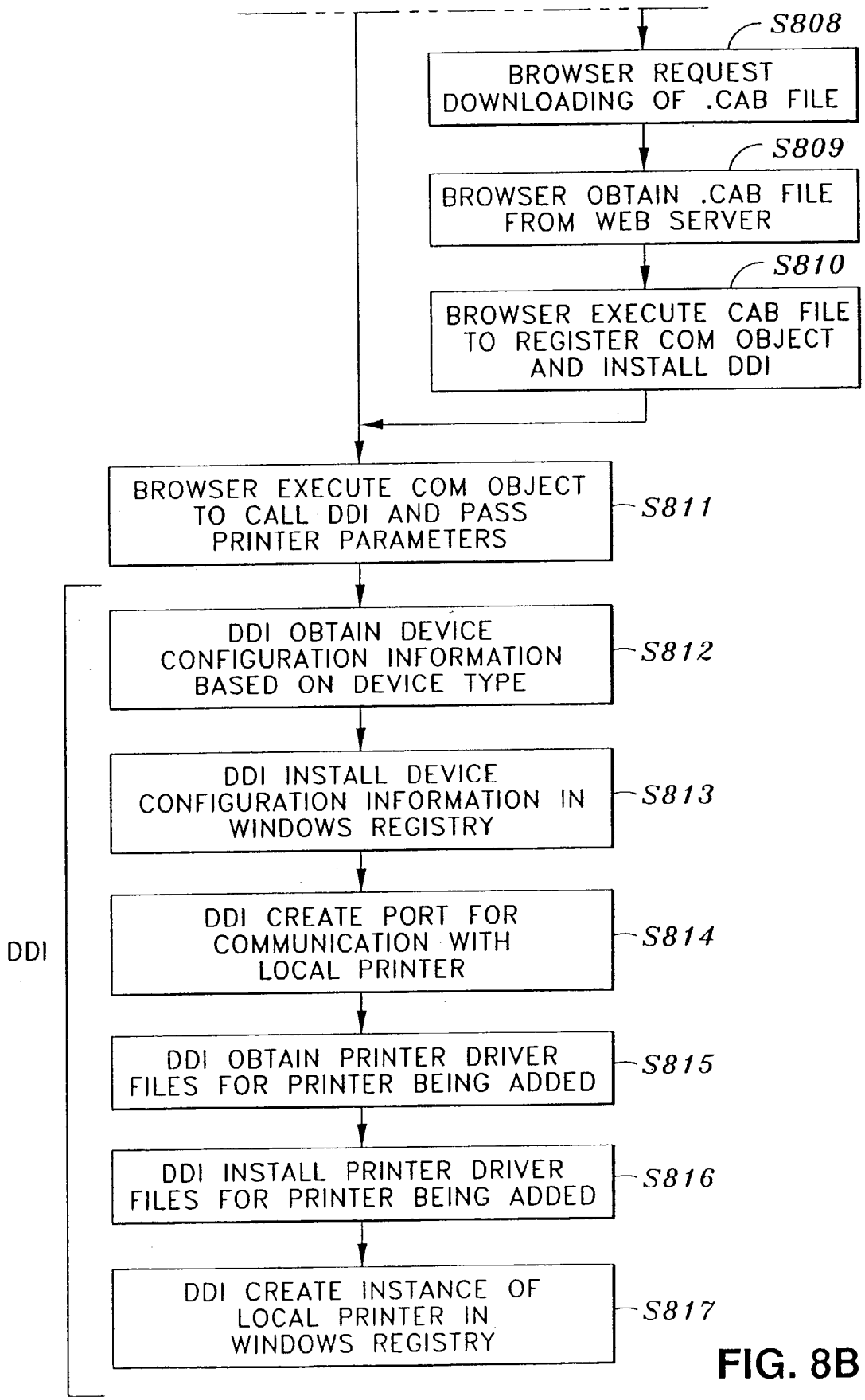
FIG. 8 is a flowchart of process steps for web based installation of printers according to the invention.

FIG. 8 is a flowchart of process steps for adding a new printer to a workstation according to the invention. In step S800, the user enters a URL for a printers installation web site. That is, the user enters the URL for the web site that provides a listing of printers that can be installed on the user's workstation, such as that shown in FIG. 5. In step S801, the user selects the option to install a local printer from the web page, in response to which the web server downloads the DiscoveredPrintersPage html page to the browser that displays the listing of printers, together with a hyperlink. The user selects the hyperlink for the printer that they want to install (step S802), in response to which the browser, noting a reference in the hyperlink, requests an active server page (InstallPrinter.asp) from the web server (step S803). The web server downloads the active server page to the browser (step S804), wherein scripts contained within the active server page are executed. One script extracts the printer's parameters (name, IP address and device type) from the hyperlink for the printer (step S805). Another executes code to create a COM object on the user's workstation and to call the DDI (step S806). In executing this script, the browser determines whether the COM object is already registered in the workstation (step S807). If not, then the browser, utilizing a code reference in the active server page, requests downloading of a .cab file (in Appendix B called webddi.cab) (step S808), receives the downloaded .cab file (step S809) and executes the cab file (step S810). In executing the .cab file, the COM object is registered in the workstation and the DDI is installed. A call is then made to execute the COM object in step S811. In step S811, the DDI function is called and the printer's parameters are passed to the DDI in the function call.

The DDI then performs the process described above with regard to FIG. 7. Briefly, the DDI obtains the configuration files for the printer utilizing the printer's information and installs them on the workstation (steps S812 and S813), creates a port for communication with the printer (step S814), obtains print driver files for the printer from a database (step S815), installs the print driver files on the workstation (step S816), and finally creates an instance of the new printer in the windows registry of the workstation (step S817).

Although the foregoing provided a description of adding an actual printer to the windows registry (i.e., a printer that is physically connected to the network), the process steps of FIG. 8 can also be utilized to install virtual printers. A virtual printer is not an actual printer that prints out a hardcopy of a print job, but rather is a printer selected in an application program for which the print job is merely rendered into a particular format and the rendered job is printed to a file on the user's workstation. FIG. 8 could be utilized, whereby the user, instead of selecting an actual printer from the listing shown in the web page of FIG. 6, may select a virtual printer from the listing instead. The process would then be the same as that described above in which the COM object is executed so that the DDI obtains device configuration information and driver files from a database and installs the virtual printer on the user's workstation.

The invention has been described with particular illustrative embodiments. It is to be understood that the invention is not limited to the above-described embodiments and that various changes and modifications may be made by those of ordinary skill in the art without departing from the spirit and scope of the invention.

APPENDIX A

```
<html>
<head>
<META NAME="GENERATOR" Content="Microsoft Developer Studio">
<META HTTP-EQUIV="Content-Type" content="text/html ; charset=iso-8859-1">
<TITLE>Install Printer</TITLE>
<meta http-equiv="content-type" content="text/html ; charset=iso-8859-1">
<head>
<!--Note: The following code displays two printers with hyper links to install them (via
InstallPrinter.asp). The arguments are passed as part of the query.-->
<a href="InstallPrinter.asp?NAME=FW_GP200&IP=146.184.23.243&TYPE=Canon GP200–
216&MAC=303030303835">FW_GP200</a>
<br>
<a href="InstallPrinter.asp?NAME=iR6000i&IP=146.184.23.204&TYPE=Canon imageRUNNER
5000–6000&MAC=00008507759C">iR6000i</a>
</body>
</html>
```

APPENDIX B

```
<HTML>
<HEAD>
<META NAME="GENERATOR" Content="Microsoft Developer Studio">
<META HTTP-EQUIV="Content-Type" content="text/html; charset=iso-8859-1">
<TITLE>Document Title</TITLE>
<SCRIPT ID=clientEventHandlersJS LANGUAGE=javascript>
</SCRIPT>
</HEAD>
<BODY bgColor=white>
<!-- Note: This Script extracts the parameters that were passed (from DiscoveredPrintersPage.html) to
this page here. They are used later. -->
<%@ LANGUAGE="JavaScript"%>
<%
    Response.Buffer = true;
    printerName = Request.QueryString("NAME");
    printerIP = Request.QueryString("IP");
    printerType = Request.QueryString("TYPE");
%>
<!-- Note: This script connects the 'PrinterInstallation.InstallPrinter' interface to the CLSID and
codebase (where to get the .cab file from if it's not already locally installed) -->
<OBJECT classid=CLSID:32196161-6A75-4F63-A5BF-B060E9A1A728
        codebase=webddi.cab id=PrinterInstallation.InstallPrinter
        VIEWASTEXT> </OBJECT>
<!-- Note: Now that the parameters have been passed in, Create the object (which is identified in the
<OBJECT> element and call InstallPrinterDevice( ), passing in the arguments acquired above.-->
<SCRIPT LANGUAGE="VBScript">
    Dim objPrinterInstallation
    Set objPrinterInstallation = CreateObject("PrinterInstallation.InstallPrinter.1")
    rtnval = objPrinterInstallation.InstallPrinterDevice("<%=printerName%>",
"<%=printerIP%>", "<%=printerType%>")
    if (rtnval = "SUCCESS")then
        MsgBox "Printer Successfully installed", vbOKOnly&vbInformation, "Install
Printer"
    else
        MsgBox "Failed to install printer", vbOKOnly&vbCritical, "Install Printer"
    end if
</SCRIPT>
</BODY>
</HTML>
```

What is claimed is:

1. A method of installing a network printer in a printers folder on a workstation for peer-to-peer communication over a network between the workstation and the network printer, the method comprising the steps of:

downloading a printers Hypertext Markup Language (html) page to the workstation, the printers html page providing a plurality of hyperlinks of network printers that can be added to the workstation;

managing a database having corresponding printer identification information, printer configuration information, and print driver information, respectively, for each of the network printers;

selecting a hyperlink from among the plurality of hyperlinks included in the downloaded html page for the network printer to be added to the workstation;

in response to the selecting step, looking for, by a browser on the workstation, an Active Server Page (ASP) referenced in the selected hyperlink and downloading the ASP to the browser, wherein the downloaded ASP contains computer executable scripts;

automatically extracting, by one of the computer executable scripts, the printer identification information of the selected network printer from the selected hyperlink and executing a component object on the workstation to install the network printer, wherein, the component object calls a function that performs the steps of:

automatically obtaining the printer configuration information and the print driver information based at least in part on the extracted printer identification information, wherein the printer configuration information and the print driver information are obtained from the managed database and are determined from the managed database by using the extracted printer identification information as a key;

automatically configuring the network printer and installing the print driver information based on the obtained printer configuration information determined from the managed database and the print driver information determined from the managed database, without further user input; and creating a locally managed instance of the network printer on the workstation for peer-to-peer communication over the network between the workstation and the network printer, wherein, when a print operation is performed on the workstation to print to the installed network printer, a print job is submitted directly to the network printer from the workstation.

2. The method according to claim 1, wherein the printer identification information is a network address of the printer.

3. The method according to claim 2, wherein the network address is an IP address of the printer.

4. The method according to claim 1, wherein the printer identification information is a Domain Name Server name of the printer.

5. The method according to claim 1, wherein the printer identification information is a NetBios name of the printer.

6. The method according to claim 1, wherein the printer is a virtual printer.

7. The method according to claim 1, wherein the function comprises a dynamic device installer.

8. The method according to claim 1, wherein the function obtains the printer configuration information and print driver information from a remote device.

9. The method according to claim 8, wherein the remote device is a File Transfer Protocol server.

10. The method according to claim 1, wherein the function further performs the step of automatically creating a port for communication with the printer.

11. The method according to claim 1, wherein, in a case where the component object to be executed is not installed on the workstation, downloading an executable file that includes the component object.

12. The method according to claim 11, wherein the executable file is a cabinet file that includes the component object and the function, the executable file installing the function on the workstation and subsequently performing the function call to execute the function.

13. Computer-executable code stored on a computer readable storage medium that, when executed, causes a computer to execute a method for installing a network printer in a printers folder on a workstation for peer-to-peer communication over a network between the workstation and the network printer, the code performing the steps of:

downloading a printers Hypertext Markup Language (html) page to the workstation, the printers html page providing a plurality of hyperlinks of network printers that can be added to the workstation;

managing a database having corresponding printer identification information, printer configuration information, and print driver information, respectively, for each of the network printers;

selecting a hyperlink from among the plurality of hyperlinks included in the printers html page for the network printer to be added to the workstation;

in response to the selecting step, looking for, by a browser on the workstation, an Active Server Page (ASP) referenced in the selected hyperlink and downloading the ASP to the browser, wherein the downloaded ASP contains computer executable scripts;

automatically extracting, by one of the computer executable scripts, the printer identification information of the selected network printer from the selected hyperlink and executing a component object on the workstation, to install the network printer, wherein, the component object calls a function that performs the steps of:

automatically obtaining the printer configuration information and the print driver information based at least in part on the extracted printer identification information, wherein the printer configuration information and the print driver information are obtained from the managed database and are determined from the managed database by using the extracted printer identification information as a key;

automatically configuring the network printer and installing the print driver information based on the obtained printer configuration information determined from the managed database and the print driver information determined from the managed database, without further user input; and creating a locally managed instance of the network printer on the workstation for peer-to-peer communication over the network between the workstation and the network printer, wherein, when a print operation is performed on the workstation to print to the installed network printer, a print job is submitted directly to the network printer from the workstation.

14. Computer-executable code according to claim 13, wherein the printer identification information is a network address of the printer.

15. Computer-executable code according to claim 14, wherein the network address is an IP address of the printer.

16. Computer-executable code according to claim 13, wherein the printer identification information is a Domain Name Server name of the printer.

17. Computer-executable code according to claim 13, wherein the function comprises a dynamic device installer.

18. Computer-executable code according to claim 13, wherein the function obtains the printer configuration information and print driver information from a remote device.

19. Computer-executable code according to claim 18, wherein the remote device is a File Transfer Protocol server.

20. Computer-executable code according to claim 13, wherein the function further performs the step of automatically creating a port for communication with the printer.

21. Computer-executable code according to claim 13, wherein, in a case where the component object to be executed is not installed on the workstation, downloading an executable file that includes the component object.

22. Computer-executable code according to claim 21, wherein the executable file is a cabinet file that includes the component object and the function, the executable file installing the function on the workstation and subsequently performing the function call to execute the function.

23. Computer-executable code according to claim 13, wherein the printer identification information is a NetBios name of the printer.

24. Computer-executable code according to claim 13, wherein the printer is a virtual printer.

25. An information processing method for installing, a device driver on an information processing apparatus, comprising the steps of:
obtaining a web page for displaying an input dialog;
displaying the input dialog, to input an instruction to request an install program of a device driver program, on a display screen by using the obtained web page, wherein the dialog includes plural hyperlinks that each correspond to one of a plurality of network printers that can be installed on the information processing apparatus;
recognizing an instruction input by a user via the displayed dialog of a selection of one of the plural hyperlinks corresponding to one of the plurality of network printers;
transmitting a request for the install program of the device driver program corresponding to the selected hyperlink of the selected network printer in accordance with the recognition of the input instruction from the user;
managing a database having corresponding printer identification information, printer configuration information, and print driver information, respectively, for each of the plurality of network printers;
obtaining the install program of the device driver program for the selected network printer from a server apparatus based on the input instruction to request the install program recognized in the recognizing step; and
executing the obtained install program to install the device driver program on the information processing apparatus, and to automatically obtain device information from the selected printer without waiting for a user's instruction for obtaining the device information, wherein printer configuration information and print driver information are determined from the managed database using printer identification information obtained from the printer as a key, and to set a printer configuration parameter of the printer in accordance with the printer configuration information determined by using the managed database wherein executing the install program comprises:

in response to selecting the hyperlink, looking for, by a browser on the information processing apparatus, an Active Server Page (ASP) referenced in the selected hyperlink and downloading the ASP to the browser, wherein the downloaded ASP contains computer executable scripts;
automatically extracting, by one of the computer executable scripts, printer identification information of the selected network printer from the selected hyperlink and executing a component object on the information processing apparatus to install the printer, wherein, the component object calls a function that performs the steps of:
automatically obtaining printer configuration information and print driver information of the selected network printer based at least in part on the extracted printer identification information, wherein the printer configuration information and the print driver information are obtained from the managed database and are determined from the managed database by using the extracted printer identification information as a key;
automatically configuring the network printer and installing the print driver information based on the obtained printer configuration information determined from the managed database and the print driver information determined from the managed database, without further user input; and
creating a locally managed instance of the network printer on the information processing apparatus for peer-to-peer communication over the network between the information processing apparatus and the network printer,
wherein, when a print operation is performed on the information processing apparatus to print to the installed network printer, a print job is submitted directly to the network printer from the information processing apparatus.

26. The method according to claim 25, wherein the printer identification information is transmitted to the server in accordance with the user's selection of the hyperlink, and wherein the install program of the driver program corresponding to the selected printer is obtained from the server.

27. The method according to claim 25, wherein the web page is described by HTML.

28. The method according to claim 25, wherein the web page is described by HTML, and the executing step executes the install program to set port information.

29. An information processing apparatus which communicates with a server apparatus and a network printer, comprising:
a web page obtaining unit for obtaining a web page for displaying an input dialog;
a display unit for displaying the input dialog, to input an instruction to request an install program of a device driver program, on a display screen by using the obtained web page, wherein the dialog includes plural hyperlinks that each correspond to one of a plurality of network printers that can be installed on the information processing apparatus;
a recognizing unit for recognizing an instruction input by a user via the displayed dialog of a selection of one of the plural hyperlinks corresponding to one of the plurality of network printers;
a transmitting unit for transmitting a request for the install program of the device driver program corresponding to the selected hyperlink of the selected network printer in accordance with the recognition of the input instruction from the user;

an install program obtaining unit for obtaining the install program of the device driver program for the selected network printer from the server apparatus based on the input instruction to request the install program recognized by the recognizing unit; and an executing unit for executing the obtained install program to install the device driver program on the information processing apparatus, wherein executing the install program comprises:

in response to selecting the hyperlink, looking for, by a browser on the information processing apparatus, an Active Server Page (ASP) referenced in the selected hyperlink and downloading the ASP to the browser, wherein the downloaded ASP contains computer executable scripts;

automatically extracting, by one of the computer executable scripts, printer identification information of the selected network printer from the selected hyperlink and executing a component object on the information processing apparatus to install the printer, wherein, the component object calls a function that performs the steps of:

automatically obtaining, from a managed database on the server that has corresponding printer identification information, printer configuration information, and print driver information, respectively, for each of the plurality of network printers, printer configuration information and print driver information of the selected network printer based at least in part on the extracted printer identification information, wherein the printer configuration information and the print driver information are obtained from the managed database by using the extracted printer identification information as a key;

automatically configuring the network printer and installing the print driver information based on the obtained printer configuration information determined from the managed database and the print driver information determined from the managed database, without further user input; and creating a locally managed instance of the network printer on the information processing apparatus for peer-to-peer communication over the network between the information processing apparatus and the network printer, wherein, when a print operation is performed on the information processing apparatus to print to the installed network printer, a print job is submitted directly to the network printer from the information processing apparatus.

30. The apparatus according to claim 29, wherein the printer identification information of the printer is transmitted to the server in accordance with the user's selection of the hyperlink, and wherein the program obtaining unit obtains the install program of the driver program corresponding to the selected printer from the server.

31. The apparatus according to claim 29, wherein the web page is described by HTML.

32. The apparatus according to claim 29, wherein the web page is described by HTML, and the executing unit executes the install program to set port information.

* * * * *